H. PETERSEN.
CULTIVATOR.
APPLICATION FILED OCT. 29, 1910.
1,012,221.
Patented Dec. 19, 1911.
4 SHEETS—SHEET 4.
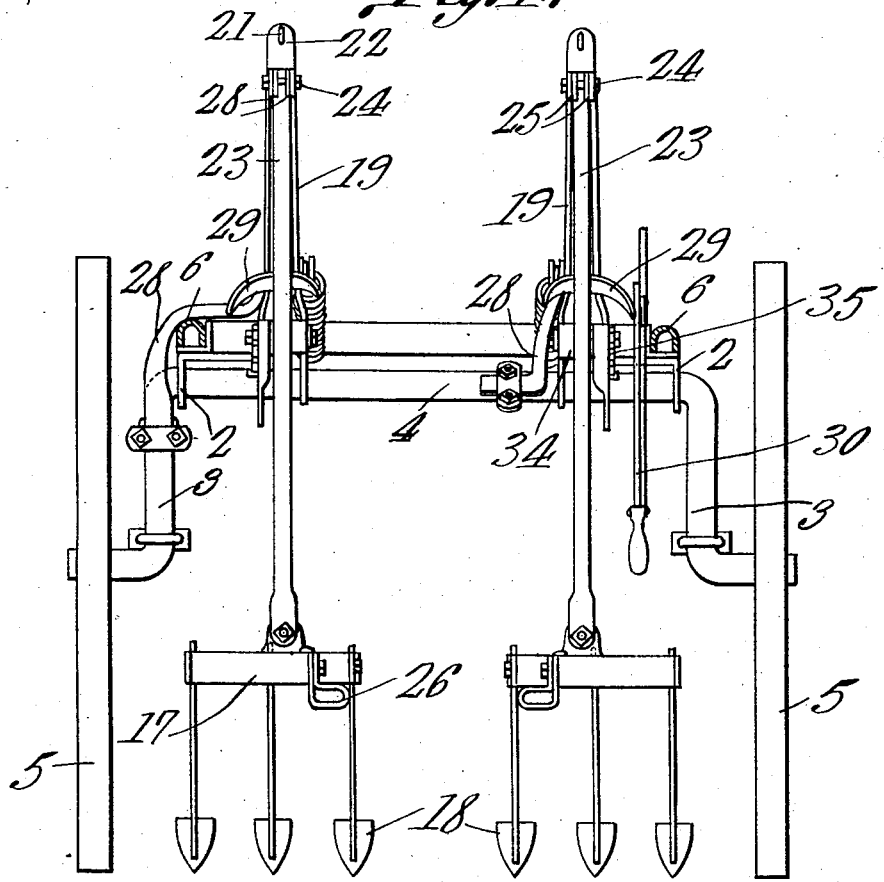
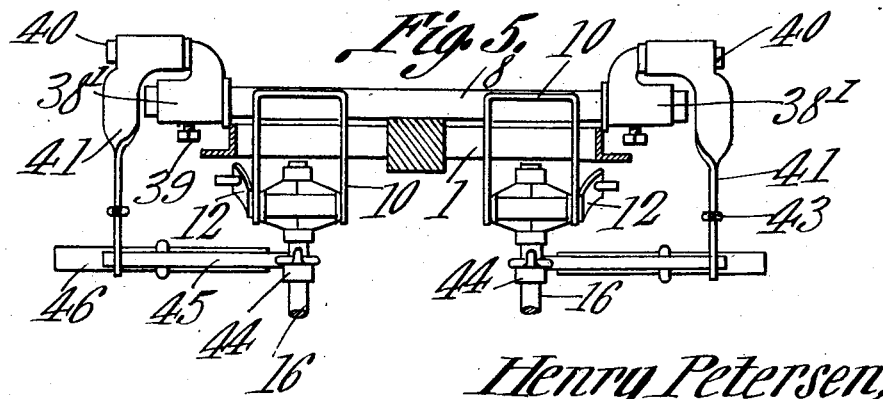
Witnesses
Henry Petersen,
Inventor
by C. A. Snow & Co.
Attorneys

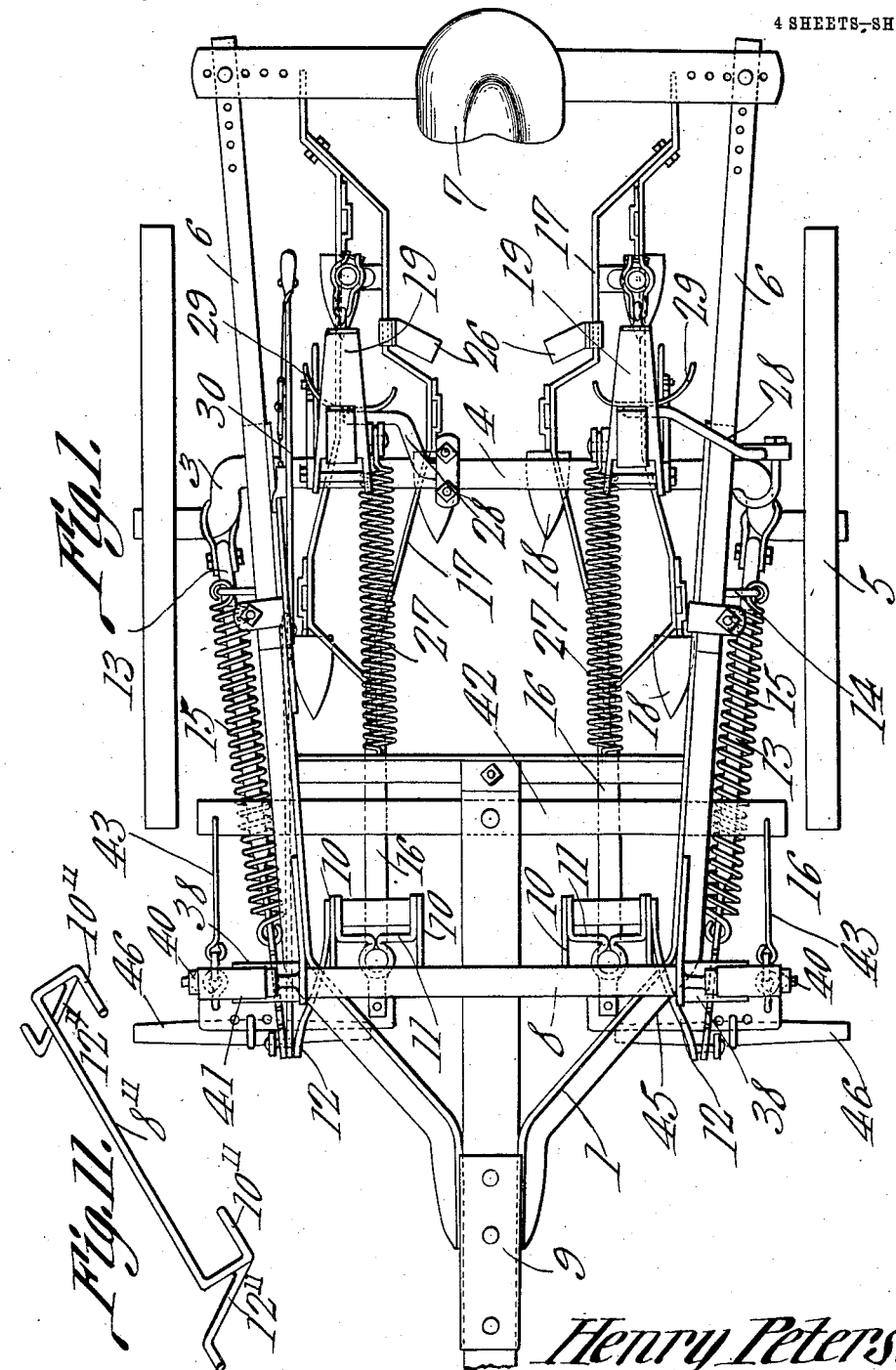

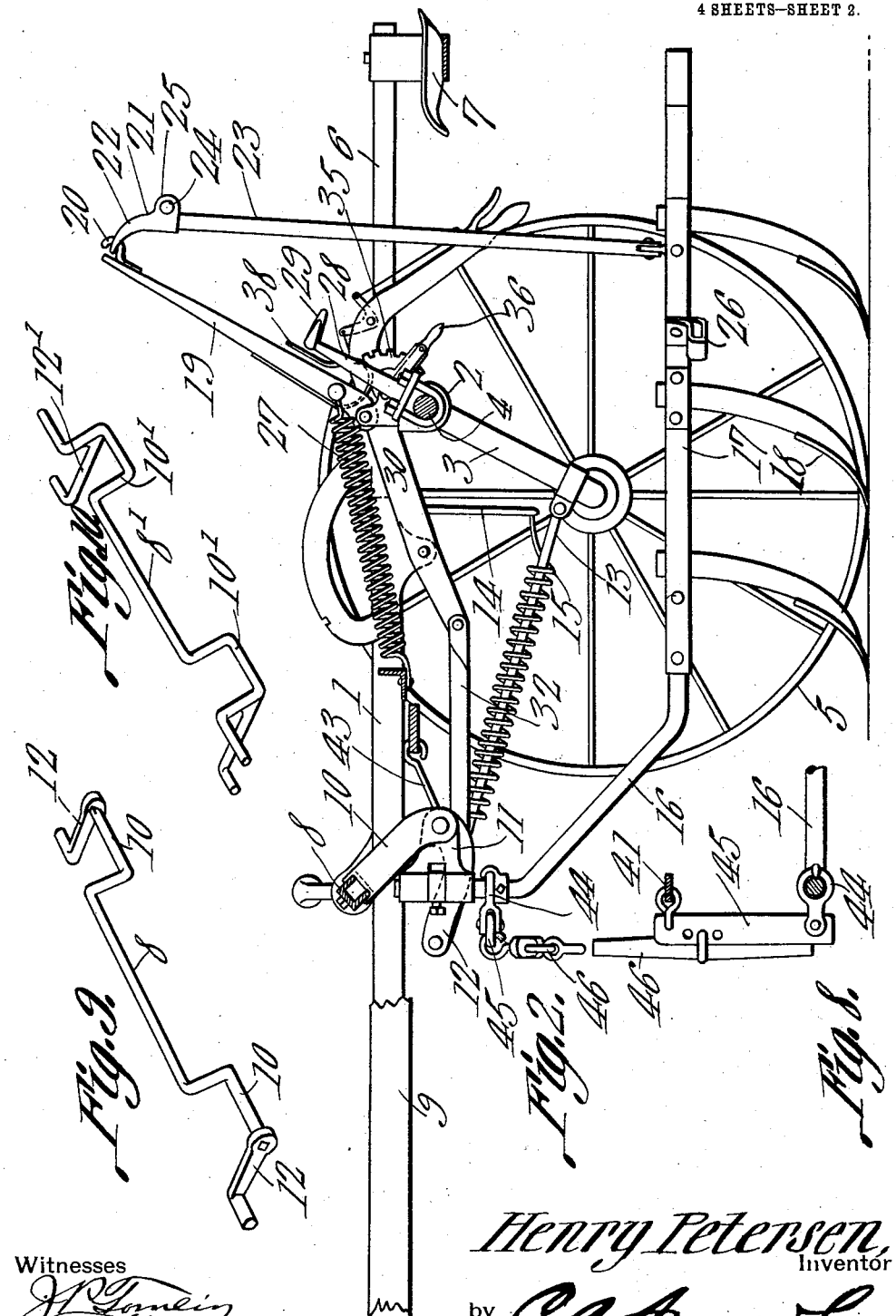

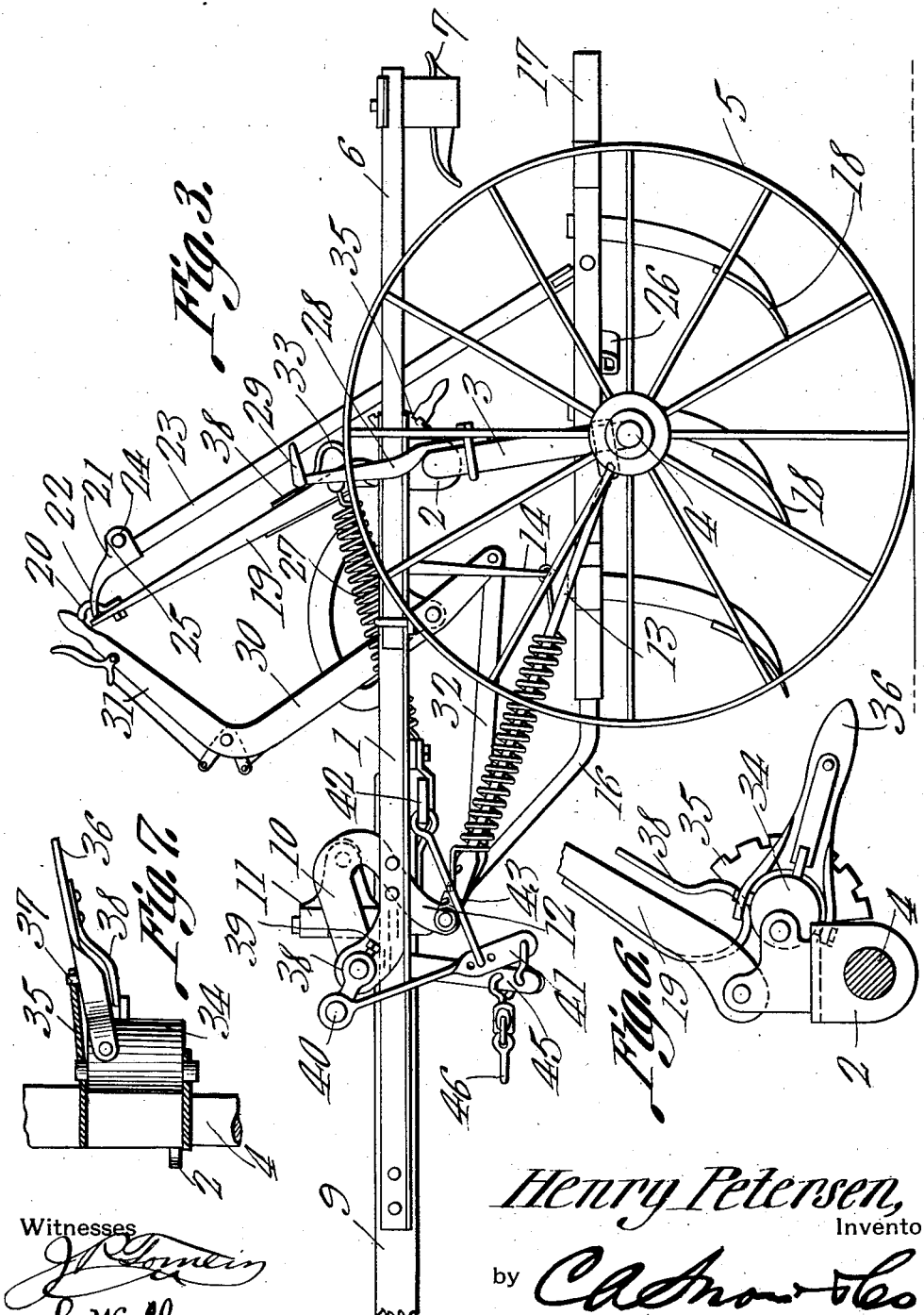

UNITED STATES PATENT OFFICE.

HENRY PETERSEN, OF MOUNT AUBURN, IOWA.

CULTIVATOR.

1,012,221. Specification of Letters Patent. Patented Dec. 19, 1911.

Application filed October 29, 1910. Serial No. 589,814.

*To all whom it may concern:*

Be it known that I, HENRY PETERSEN, a citizen of the United States, residing at Mount Auburn, in the county of Benton and State of Iowa, have invented a new and useful Cultivator, of which the following is a specification.

This invention relates to straddle row cultivators and consists in the novel construction and arrangement of its parts as hereinafter described and claimed.

The subject matter of the present invention relates to that type of cultivator which is generally known as a sulky cultivator and upon which is employed pivoted masts which in turn are provided with connections whereby they are attached to pivoted gang frames attached to the frame of the cultivator. In such a cultivator the soil engaging members carried by the gang frames together with the said frames are guided by an operator who is seated upon the main frame of the cultivator, as the said cultivator moves along a row of plants, so that the said soil engaging members are caused to dodge in and out and are held in proper relation to the row of plants. Heretofore, in some cases, this operation has been tiresome and laborious for the reason that the outermost shovels of the gang of shovels upon the gang frame have been located behind the shovels which operate nearest the plants, and consequently have interfered with the easy swing of the gang frame in lateral directions to keep the plant shovels in proper position with relation to the row of plants, but in the present arrangement the shovels nearest the supporting wheels are located nearest the points of the pivotal connection between the forward ends of the gang frames and the main frame and consequently the radii of the arc of lateral swinging movement are reduced and the lateral swinging movement of the gang frames may be more easily accomplished. In the new arrangement of the soil engaging members, it was found difficult to raise the said members, the desired distance from the ground. For this reason the rock bar has been adopted.

With this object in view the novel arrangement embodied in the cultivator consists in journaling a rock bar upon the forward end portion of the main frame of the cultivator and providing the said rock bar with cranks, the forward ends of the gang frames having swivel connection with the cranks upon the rock bar. A single lever mechanism is mounted upon the main frame and is operatively connected with the said rock bar and the arch axle of the cultivator whereby as the said lever mechanism is manipulated, the rock bar is turned and the axle is swung which results in lifting the forward and rear end portions of the said gang frames simultaneously. Novel means are provided for limiting the pivotal movement of the masts upon the main frame of the cultivator and arms are attached to the arch axle and are adapted to swing with the same and engage the said masts to cause the said masts to swing upon their pivots as the arch axle is swung.

A further object of the invention is to provide a draft means with means for connecting the same to the gang frames and the frame of the cultivator in such manner that the draft strain is proportioned or divided between the main and gang frames and the draft strain is utilized to hold the soil engaging members steadily against their work whereby the lever mechanism is relieved of the strain.

In the accompanying drawings:—Figure 1 is a top plan view of the cultivator. Fig. 2 is a longitudinal sectional view of the same showing the gang frame in lowered position. Fig. 3 is a side elevation of the same showing the gang frame in elevated position. Fig. 4 is a rear end view of the cultivator. Fig. 5 is a front end view of a portion of the cultivator. Fig. 6 is a side elevation of a portion of one of the masts and adjacent parts. Fig. 7 is a top plan view of a device for limiting the swinging movement of the mast. Fig. 8 is a plan view partly in section of part of a draft transmitting device used upon the cultivator. Fig. 9 is a perspective view of a crank rock bar which may be used upon the cultivator. Fig. 10 is a perspective view of a modified form of said crank rock bar. Fig. 11 is a perspective view of another modified form of said rock bar.

The cultivator includes a main frame 1 provided with bearings 2. An arch axle 4 is journaled in the said bearings and ground wheels 5 are journaled for rotation upon the ends of the depending or crank portions 3 of said axle 4. Bars 6 extend rearwardly from the frame 1 and support a hammock seat 7 of usual pattern.

A rock bar 8 is journaled upon the forward portion of the frame 1 and a draft tongue 9 is also connected with the forward portions of the said frame. The rock bar 8 is provided with cranks 10 which are arranged to swing vertically and upon which yokes 11 are journaled. Each of the crank devices is provided with a forwardly disposed portion or arm 12 and rods 13 are pivotally connected at their forward ends with the lower forward ends of the said arms 12 and at their rear ends the said rods 13 are connected with the lower end portions of the depending or crank portion 3 of the axle 4.

Fixed arms 14 depend from the main frame 1 and coiled springs 15 surround the intermediate portions of the rod 13 and the forward ends of the said coiled springs 15 are connected with the arms 12 while the rear ends of the said coiled springs 15 are connected with the lower ends of the arms 14. The springs 15 are under tension with a tendency to draw the lower forward ends of the arms 12 toward the arms 14.

The forward ends of the beams 16 are journaled in the yokes 11 and the axes of movement of the said beams 16 lie at right angles to the axis about which the said yokes 11 swing. Gang frames 17 are attached to the rear ends of the beams 16 and soil engaging members 18 are attached to the said gang frames 17.

Masts 19 are pivoted at their lower ends upon the frame 1 and are provided at their upper ends with hooks 20. Sleeves 21 are provided with eyes 22 which receive the hooks 20 and the said sleeves receive the upper ends of pendulum bars 23. The said sleeves are held in fixed position with relation to the said bars by means of clamp bolts 24 which pass transversely through spaced lugs 25 carried by the said sleeves and secure the said sleeves in position as indicated. The lower ends of the pendulum bars 23 are pivotally connected with the gang frames 17 and the said gang frames are provided with stirrups 26 of any usual pattern.

Coiled springs 27 are connected at their forward ends with the frame 1 and at their rear ends with the masts 19 at points above the points of pivotal connection between the said masts and the said frame 1. The springs 27 are under tension with a tendency to draw the upper free ends of the said masts 19 in a forward direction.

Arms 28 are fixed to the intermediate arch portions 3 of the axle 4 and extend between but are separate from the masts 19 and pendulum bars 23, and these arms terminate at their upper ends in forks 29 the branches of which receive the pendulum bars 23 between them. The branches of the forked extremities 29 are adapted to limit the lateral swinging movement of the said pendulum bars 23. The forward portions of the upper ends of the arms 28 are adapted to engage the rear sides of the masts 19 and swing the said masts in a forward direction when the axle 4 is swung back about that portion which is journaled in the bearings 2 as an axis. This operation raises the rear end of the gang and, when the above movement is reversed, the arms engage the pendulum bars and thus cause the masts 19 to swing rearwardly and downwardly, thereby lowering the rear portion of the gang.

A lever 30 is fulcrumed upon the frame 1 and is provided with a power end portion 31 which is normally downwardly disposed toward one of the gang-frames 17 as shown in Fig. 2. The working end of the lever 30 is operatively connected with one of the crank arms 12 mounted upon the rock bar 8 by means of a bar 32 which is pivotally connected at one end with the said lever and pivotally connected at its other end with the said crank arm 12, and arranged to move horizontally to turn the rock bar 8.

From the above description it will be seen that when an operator is occupying the seat 7 and his feet are in the stirrups 26 he may readily reach down and grasp the power end portion 31 of the lever 30 and by the purchase thus gained may readily swing the power end of the said lever 30 in an upward direction whereby the bar 32 is moved longitudinally and the rock bar 8 is partially rotated in its bearings upon the frame 1. At the same time through the connecting rod 13 the lower or end portions of the axle 4 are swung about the intermediate portion thereof which is journaled in the bearing 2.

Any suitable means may be employed for distributing the draft strain among the gang frames and the main frame. In the form shown in the drawings sleeves 38 are located upon the end portions of the rock bar 8 and held in fixed position thereon by means of set screws 39. Prior to fixing the said sleeves they may be adjusted so that the pintles 40 carried thereby are in a desired relation to the crank 10 carried by the said rock bar. The pintles 40 are horizontally disposed and are eccentrically positioned with relation to the said rock bar 8. Hangers 41 are loosely journaled upon the pintles 40 and hang pendantly therefrom. A double tree 42 is pivoted to the rear end portion of the tongue 9 and the draft rods 43 are pivotally connected at their forward ends with the lower end portions of the hangers 41 at points above the points of connection of the draft bars and at their rear ends are pivotally connected with the ends of the double tree 42. Lugs 44 are pivotally located below the swivel coupling at the upper forward ends of the beams 16 and horizontal draft bars 45 are swiveled at their inner ends with the said lugs 44 and are pivotally connected at their outer ends with the lower ends of said hangers 41. Swingle trees 46 are adjustably attached to the draft bars 45.

Eccentric mast stops 34 are journaled upon the main frame 1 of the cultivator and gear segments 35 are fixed to the main frame of the cultivator adjacent the ends of the said eccentrics 34. Handle levers 36 are operatively connected with the said eccentrics 34 and adapted when swung to turn the same. The said handle levers 36 are provided with pawls 37 which are adjusted to engage the teeth of the segments 35 and hold the said levers 36 and eccentrics 34 in adjusted position. Flat springs 38 are fixed to the lower end portions of the masts and at the forward sides thereof and are looped down under the lower intermediate portions of the said masts and bear against the peripheries of the eccentrics 34. The upper rear ends of the said spring bear against the rear sides of the masts and serve as means for resiliently holding the said masts in upright position. Therefore it will be seen that resilient means are provided for limiting the swinging movement of the masts upon their pivots.

As additional advantages for the structures hereinbefore described it will be seen that the shovels of the gangs of shovels are in plain view of an operator mounted upon the seat of a cultivator and consequently the said operator may more accurately operate the gangs of shovels. Also the plows will operate at a uniform depth in the ground because they are directly located under the carrying wheels of the main frame of the cultivator and the said shovels will draw easily because they are closer to the draft animals and the gangs of shovels when in elevated position or approaching such positions are evenly balanced upon the intermediate portion of the axle. Therefore in raising or lowering the gang frame there is no tendency for the said frames to pitch or tilt in forward or rearward directions.

Having thus described my invention, what I claim as new and desire to secure by Letters Patent is:

1. A cultivator comprising a main frame, an arch axle supporting said frame, wheels journaled upon the axle, a gang frame located beneath the main frame, a rock bar journaled upon said main frame, a crank on said rock bar, a connection between said crank and the forward end of said gang frame, means for turning said rock bar, a movable mast projecting upwardly from said main frame, a connection between the upper end of said mast and the rear end of said gang frame, connecting means between the said crank and the axle, and a tension spring connected between said main frame and the crank of the said rock bar.

2. A cultivator comprising a main frame, an arch axle supporting the same, wheels journaled upon said axle, a gang frame located beneath said main frame, a rock bar journaled upon said main frame, a crank located on the rock bar, a yoke journaled upon said crank, a beam on the forward part of the gang frame and having its upper end swiveled in said yoke, means for turning said rock bar, a mast pivoted to said main frame for free movement and projecting upwardly therefrom, a connection between the upper end of said mast and the rear end of said gang frame, a rod pivotally connected to said crank and the axle, means for creating a forward resilient tension on said mast, and means for creating a resilient tension rearwardly upon said crank.

3. A cultivator comprising a main frame, an arch axle supporting the same, wheels journaled upon said axle, a gang frame located beneath said main frame, a rock bar journaled upon said main frame, means for turning said rock bar, a crank on said rock bar, a swivel connection between said crank and the forward part of said gang frame, a connecting rod pivotally connected between said crank and the axle, a mast pivotally mounted on said main frame and projecting upwardly therefrom and adapted to rock forward or back, a connection between the top of said mast and the rear end of said gang frame, an arm projecting upwardly from the arch of said axle and located between said mast and said connection and adapted to engage the said mast and connection alternately when said arch is moved forward or back, the upper end of said arm being disposed rearwardly to limit the sidewise swinging movement of said connection.

4. A cultivator comprising a wheel supported main frame, a gang frame pivotally connected with the main frame, a mast pivotally supported upon the main frame, a connection between the mast and the said gang frame, an eccentric journaled upon the main frame and adapted to limit the pivotal movement of the mast, and a spring connected at one end to one side of the mast and looped under the lower portion thereof and bearing against the periphery of said eccentric.

5. A cultivator comprising a wheel mounted frame, a rock bar journaled upon the frame and having a crank, a gang frame having swivel connection with the crank of the rock bar, a lever mechanism mounted upon the first mentioned frame and having eccentric connection with the rock bar, a draft appliance also having eccentric connection with said rock bar, and draft transmission means between the said draft appliance and the main frame and the said draft appliance and the gang frame.

6. A cultivator comprising a wheel mounted main frame, a rock bar journaled upon the main frame and having a crank, a gang frame having swivel connection with the crank of the rock bar, a lever mechanism mounted upon the main frame and having eccentric connection with the rock bar, a draft appliance also having eccentric connection with the rock bar, the point of connection between the lever mechanism and the rock bar being at the opposite side of the axis of the said bar from the point of connection between the draft appliance and the rock bar, a draft transmitting means between the draft appliance and the main frame and a draft transmitting means between the draft appliance and the gang frame.

7. A cultivator comprising a wheel supported arch axle, a main frame carried thereby, a gang frame interposed between the supporting wheels and under the frame, a rock bar carried by the main frame, and constituting means for elevating the forward end of the gang frame, a connection between said gang frame and the rock bar for permitting lateral swinging of the gang frame relative to the main frame, a spring controlled connection between the rock bar and the arch axle for holding said axle normally elevated and the frames normally raised, a mast pivotally mounted on the main frame, yielding means for holding the mast normally elevated, a pendulum bar connecting the mast and the rear portion of the gang frame, means for actuating the rock bar to shift the arch axle out of normal position and to lower the front portion of the gang frame, and means operated by the arch axle during such movement for engaging and shifting the pendulum bar to shift the mast out of normal position and lower the rear portion of the gang frame.

8. A cultivator comprising a wheel supported arch axle, a main frame carried by the axle, a mast pivotally mounted on said frame, a pendulum bar pivotally connected to and suspended from the mast, yielding means for holding the mast normally in raised position, a gang frame pivotally engaged by the pendulum bar and supported at the rear thereby, means under the control of the driver for simultaneously swinging the arch axle relative to the main frame and raising or lowering the forward portion of the gang frame, and means movable with the arch axle and between the mast and pendulum for engaging the mast to swing it in one direction and raise the gang frame and for engaging the pendulum and moving it in the opposite direction to lower the gang frame, said means being separate from the mast and pendulum.

9. A cultivator including a wheel supported arch axle, a main frame mounted thereon, a gang frame, mechanism on the main frame and under the control of the operator for elevating the front portion of the gang frame and, at the same time, swinging the axle relative to the main frame, a mast pivotally mounted on the main frame, a pendulum bar pivotally connected to the mast and to the rear portion of the gang frame, and means movable with the axle and extending between and separate from the mast and pendulum bar for moving against and shifting the mast and raising the rear portion of the gang frame in unison with the front portion, and for moving against the pendulum to shift the mast and lower the rear end of the gang frame.

10. A cultivator including a wheel supported arch axle, a main frame carried by said axle, a gang frame, mechanism on the main frame and under the control of the operator for swinging the axle relative to the main frame and, at the same time, raising or lowering the front portion of the gang frame, a mast pivotally mounted on the main frame, a bar connecting the mast with the rear portion of the gang frame, said bar being pivotally attached to the mast and gang frame, and means projecting between and separate from the mast and bar and movable in one direction with the axle against the mast and in the opposite direction therewith against the bar for respectively raising and lowering the rear portion of the gang frame.

11. In a cultivator, the combination with a wheel supported arch axle, and a main frame mounted on said axle, of a gang frame, mechanism under the control of the operator and upon the main frame for raising the front portion of the gang frame and, at the same time, swinging the axle relative to the main frame, a mast upon the main frame, a connection between the mast and the rear portion of the gang frame, means operated by said movement of the axle and separate from the mast for moving against and shifting the mast in one direction to raise the rear portion of the gang frame in unison with the front portion thereof, and yielding means for assisting such movement of the mast and axle, said means being movable in the opposite direction to lower the gang frame, and means adapted to be actuated by said first mentioned means for shifting the mast to lower the gang frame.

12. A cultivator including a wheel supported arch axle, a main frame supported thereby, a gang frame, mechanism upon the main frame and under the control of the operator for swinging the axle relative to the main frame and, at the same time, raising or lowering the front portion of the gang frame, a mast upon the main frame, a connection between the mast and the rear portion of the gang frame, means movable with the axle and separate from the mast for moving against and engaging the mast to elevate the rear portion of the gang frame and for engaging said connection to shift the mast and lower the rear portion of the gang frame, an adjustable stop in the path of the mast, and a cushioning device carried by the mast for engaging the stop during the lowering of the gang frame.

In testimony that I claim the foregoing as my own, I have hereto affixed my signature in the presence of two witnesses.

HENRY PETERSEN.

Witnesses:
F. B. OCHSENREITER,
L. WILLSON.

Copies of this patent may be obtained for five cents each, by addressing the "Commissioner of Patents, Washington, D. C."